P. M. MARKO.
STORAGE BATTERY.
APPLICATION FILED JULY 5, 1918.
1,368,817.
Patented Feb. 15, 1921.
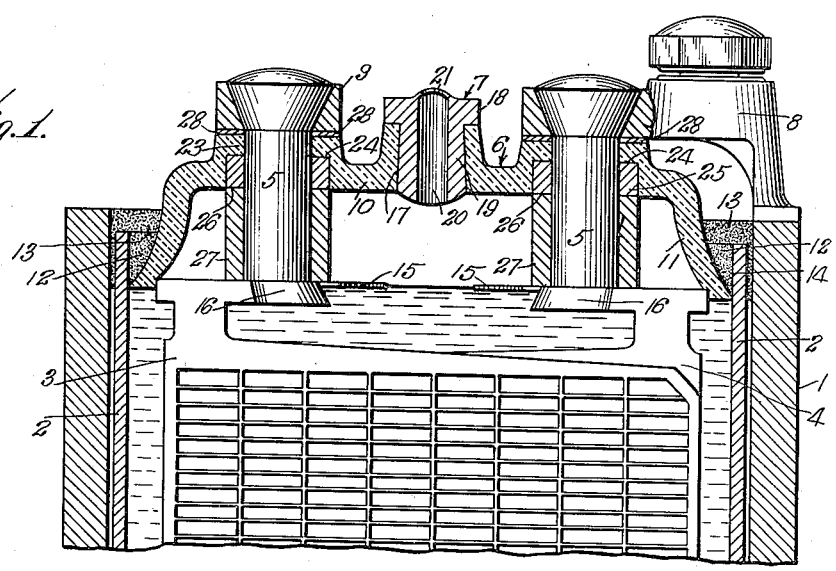
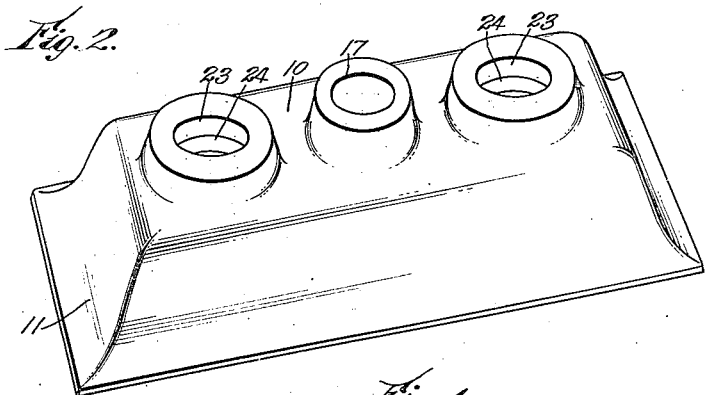
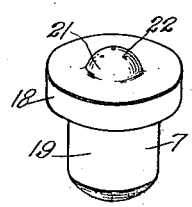
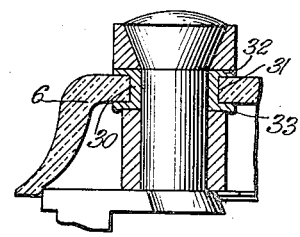
WITNESSES
INVENTOR
Paul M. Marko
BY
ATTORNEYS

UNITED STATES PATENT OFFICE.

PAUL M. MARKO, OF BROOKLYN, NEW YORK.

STORAGE BATTERY.

1,368,817.  Specification of Letters Patent.  Patented Feb. 15, 1921.

Application filed July 5, 1918. Serial No. 243,428.

*To all whom it may concern:*

Be it known that I, PAUL M. MARKO, a citizen of the United States, and a resident of the city of New York, borough of Brooklyn, in the county of Kings and State of New York, have invented a new and Improved Storage Battery, of which the following is a full, clear, and exact description.

This invention relates to storage batteries, and has for its general object to provide a novel form of jar cover which permits of the level of the electrolyte to be easily and quickly ascertained without removing the vent or filling plug, this result being obtained by the making of the cover of transparent pressed glass of special design and arranging the cover in such a manner that light enters the cell laterally as well as from above, and within the cell are two distinctly colored arrows attached to the terminal posts in such a position as to be seen either from the top or sides of the transparent cover, and these serve as means for determining the proper level of the electrolyte.

Another object of the invention is to provide a simple, novel and effective vent plug which is preferably made of soft rubber in one piece and expanding downwardly so as to self-lock in the vent plug opening of the glass cover, which opening expands downwardly, due to the tapered form of the molding pin.

An additional object is to provide a novel construction whereby an acid-tight joint is obtained between the terminal post and the cover, which prevents the leakage of acid with its attendant evils.

With such and other objects in view, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a section of the upper portion of a storage battery;

Fig. 2 is a view of the cover removed;

Fig. 3 is a perspective view of one of the terminal posts and battery plate straps with the electrolyte level pointer attached to the post;

Fig. 4 is a perspective view of the vent plug for the filling opening of the cover; and Fig. 5 is a detail view showing a modified form of cell between the cover and terminal post.

Referring to the drawing, 1 designates the battery box, 2 the jar of the cell therein, 3 and 4 the plates, 5 the terminal posts, 6 the cover, 7 the vent plug, 8 a terminal connector, and 9 a coupling connector.

The cover 6 is made of transparent pressed glass which is selected not only because it is the best non-insulator, but because it admits light to the cell, whereby the level of the electrolyte can be ascertained at any time by light admitted to the cover. The cover comprises a flat plate 10 having a surrounding wall 11 which enters the jar 2 and is of such size as to lie in close proximity to the walls of the jar so as to form a surrounding channel 12 which receives a sealing compound 13, part of which latter fills the space at 14 between the jar and the battery box. The cover 6 is supported in such a position that a substantial part of the side walls 11 thereof will project upwardly above the top of the box, so that light can pass through the side walls of the cover as well as through the top, and consequently the interior of the cell will be effectively lighted. By this means the red arrows or equivalent elements 15 can be readily seen to determine the level of the electrolyte, these arrows being fastened to the terminal posts 5 at the plate straps 16. The arrows point inwardly toward each other from the positions where they can be readily seen through the top plate portion 6 of the glass cover.

The cover 6 is molded with a filling opening 17 which has a slight upward taper resulting from the taper of the molding pin, and in this tapered opening is fitted a self-locking rubber vent plug 7. This plug is made of a single piece of rubber and has a head or flange 18 at its top to limit the inward movement of the plug. The body 19 in being inserted in the opening 17 is first compressed, because it enters the smallest end of the opening, and as the plug is inserted it progressively expands until fully inserted, when it will be firmly locked in place without the need of screw threads or any other holding means. The vent bore 20 of the plug is covered by an extremely thin web 21 of rubber which is integral with the body of the plug, and this has small vent apertures 22 which are capable of expanding under the pressure of gas generated in the cell. These holes are small enough to prevent the electrolyte from splashing out, yet they will serve for gas venting.

Beside the opening 17 the cover 6 has terminal post openings 23 each enlarged at the under side of the cover to form a shoulder 24 against which bears a packing ring 25 which fills the enlarged portion of the terminal post opening. This ring bears against an abutment 26 formed by the upper end of a hard rubber sleeve 27 which surrounds the terminal post and bears on the plate strap 16. The ring is coated with cement before it is applied to the terminal post, so that when the cover is pressed home the packing ring will make an excellent acid-tight joint. On the cover 6 is a packing ring 28 at each opening 23, which lies between the cover and the connector to form an additional means for securing liquid-tightness. When the connector and binding post are burned together the rubber rings 25 and 28 become vulcanized, so that the cover and terminal posts are united like one piece and consequently there is positively no chance for the electrolyte to leak out of the cover.

In the modification shown in Fig. 5 a rubber packing ring 30 is fitted in the opening 31 of the cover for the terminal post, the ring having lower and upper flanges 32 and 33 so as to take the place of the packing rings 25 and 28.

From the foregoing description taken in connection with the accompanying drawing, the construction and the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a battery box, a cell jar therein, and a glass cover of relatively thin cross section for the jar arranged in protruding relation to the ledge of the box, whereby light can enter the cell through the sides and top of the cover.

2. The combination of a battery box, a cell jar therein, a glass cover of relatively uniform cross section and hollow on its under side and supported in the jar in protruding relation to the top edges of the box and cell jar, whereby light can enter the cell through the sides and top of the cover, and means in the jar and observable through the cover for showing the level of the electrolyte.

3. The combination of a battery jar, with a transparent glass cover having lateral walls extending into the jar, with the top of the cover hollowed out and disposed outside of the jar edge or top of the jar.

4. The combination of a battery jar, with a pressed glass cover hollow on its under side and having walls sloping outwardly to the walls of the jar, whereby a channel is formed, the cover being supported in the jar with the upper part of the cover protruding therefrom, whereby light can enter the jar through the sides and top of the cover, and a sealing compound in the channel.

5. In a battery, the combination of a cover having a terminal post opening, a plate structure having a terminal post extending through the opening, a packing ring in the opening and having upper and lower flanges bearing on the upper and lower surfaces of the cover, and a shoulder on the post bearing against the lower flange of the packing ring.

6. The combination of a battery jar, a cover therefor having a terminal post opening, a plate structure in the jar and having a terminal post extending through the opening, said opening having a shoulder, a packing ring in the opening and bearing against the shoulder, and surrounding the post, and a sleeve surrounding the post and forming an abutment against which the packing ring bears.

PAUL M. MARKO.